United States Patent
Sidman

(10) Patent No.: US 12,041,168 B2
(45) Date of Patent: Jul. 16, 2024

(54) INTERNET PACKET PROVENANCE TO VERIFY PACKET VALIDITY AND CONTROL PACKET USAGE

(71) Applicant: Anon-X, Inc., Penn Valley, CA (US)

(72) Inventor: George Sidman, Penn Valley, CA (US)

(73) Assignee: ANON-X, INC., Penn Valley, CA (US)

( * ) Notice: Subject to any disclaimer, the term of this patent is extended or adjusted under 35 U.S.C. 154(b) by 0 days.

(21) Appl. No.: 18/348,985

(22) Filed: Jul. 7, 2023

(65) Prior Publication Data
US 2024/0015016 A1 Jan. 11, 2024

Related U.S. Application Data

(60) Provisional application No. 63/359,597, filed on Jul. 8, 2022.

(51) Int. Cl.
*H04L 9/32* (2006.01)
*H04L 9/40* (2022.01)

(52) U.S. Cl.
CPC ............ *H04L 9/32* (2013.01); *H04L 63/0245* (2013.01); *H04L 63/0428* (2013.01); *H04L 63/0464* (2013.01); *H04L 63/0876* (2013.01); *H04L 63/123* (2013.01)

(58) Field of Classification Search
CPC ..... H04L 9/32; H04L 63/0428; H04L 63/123; H04L 63/0245; H04L 63/0464; H04L 63/0876; H04L 47/35; H04L 12/4633
See application file for complete search history.

(56) References Cited

U.S. PATENT DOCUMENTS

| | | | | |
|---|---|---|---|---|
| 6,092,191 | A * | 7/2000 | Shimbo | H04L 63/0428 713/168 |
| 10,250,390 | B1 * | 4/2019 | Gray | H04L 9/3239 |
| 10,826,876 | B1 * | 11/2020 | Sinn | H04L 63/162 |
| 10,979,402 | B1 * | 4/2021 | Hartley | H04W 12/02 |
| 11,048,686 | B2 * | 6/2021 | Rapanen | H04L 9/3239 |

(Continued)

OTHER PUBLICATIONS

Liu, Xin, et al. "Passport: Secure and Adoptable Source Authentication." Nsdi. vol. 8. 2008. (Year: 2008).*

(Continued)

*Primary Examiner* — Michael Simitoski
(74) *Attorney, Agent, or Firm* — Womble Bond Dickinson (US) LLP

(57) ABSTRACT

This disclosure provides systems, devices, apparatus, and methods, including computer programs encoded on storage media, to verify packet validity and control packet usage based on centrally stored and locally cached device profiles and usage policies. A processing device may receive, at an encryption tunnel, an unencrypted packet or a previously encrypted packet. The packet is encrypted with a one or more layers of encryption (e.g., C2 and/or C1). The processing device generates a Passport to accompany the packet, where the Passport is a data file including information to validate the packet and control packet usage. The processing device encrypts the Passport and the packet with an additional layer of encryption (C3) that provides a multi-tiered encryption stack for the packet and outputs, from the encryption tunnel, the Passport and the packet encrypted with the additional layer of encryption.

21 Claims, 10 Drawing Sheets

(56) References Cited

U.S. PATENT DOCUMENTS

| | | | | |
|---|---|---|---|---|
| 2003/0185368 A1* | 10/2003 | Bradfield | H04L 67/02 | 379/201.03 |
| 2008/0259919 A1* | 10/2008 | Monga | H04L 43/12 | 370/389 |
| 2013/0239169 A1* | 9/2013 | Nakhjiri | H04L 63/123 | 726/1 |
| 2017/0161270 A1* | 6/2017 | Mason, Jr. | G06F 11/1464 | |
| 2017/0171364 A1* | 6/2017 | Hu | H04L 69/22 | |
| 2018/0115529 A1* | 4/2018 | Munger | H04L 63/0227 | |
| 2019/0109714 A1* | 4/2019 | Clark | H04L 67/565 | |
| 2019/0349426 A1* | 11/2019 | Smith | H04L 67/562 | |
| 2020/0084222 A1* | 3/2020 | William | H04L 9/3242 | |
| 2021/0352109 A1* | 11/2021 | Hughes | H04L 47/33 | |
| 2022/0345459 A1* | 10/2022 | Tseng | H04L 63/0245 | |
| 2022/0377823 A1* | 11/2022 | Elazzouni | H04W 76/14 | |
| 2023/0126851 A1* | 4/2023 | Bansal | H04L 63/123 | 726/15 |
| 2023/0179635 A1* | 6/2023 | Schiel | H04L 63/20 | 726/23 |
| 2023/0188534 A1* | 6/2023 | Hill | H04L 63/205 | 713/150 |
| 2023/0247006 A1* | 8/2023 | Pemmaraju | H04L 63/0823 | 726/11 |

OTHER PUBLICATIONS

Wang, Lei, Tianbing Xia, and Jennifer Seberry. "Inter-domain routing validator based spoofing defence system." 2010 IEEE International Conference on Intelligence and Security Informatics. IEEE, 2010. (Year: 2010).*

Naous, Jad, et al. "Verifying and enforcing network paths with ICING." Proceedings of the Seventh Conference on Emerging Networking Experiments and Technologies. 2011. (Year: 2011).*

T. Wolf, S. Natarajan and K. T. Vasudevan, "High-Performance Capabilities for 1-Hop Containment of Network Attacks," in IEEE/ACM Transactions on Networking, vol. 21, No. 6, pp. 1931-1946, Dec. 2013, doi: 10.1109/TNET.2013.2240463. (Year: 2013).*

* cited by examiner

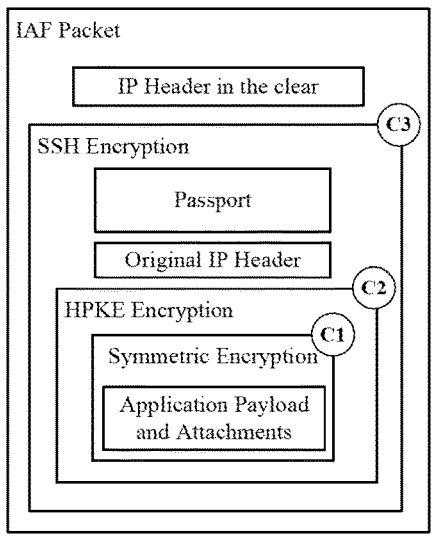 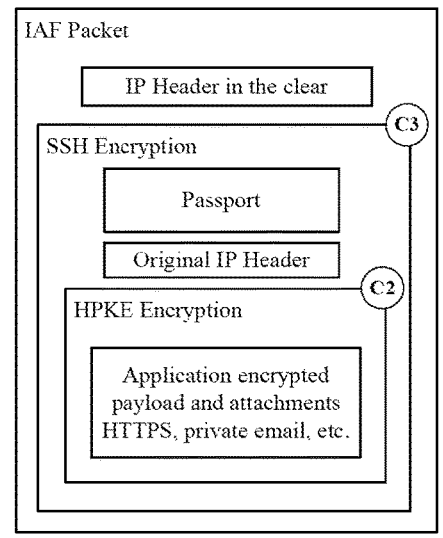
FIG. 9A                    FIG. 9B

INTERNET PACKET PROVENANCE TO VERIFY PACKET VALIDITY AND CONTROL PACKET USAGE

CROSS-REFERENCE TO RELATED APPLICATIONS

This application claims benefit of and priority to U.S. Provisional Patent Application No. 63/359,597 entitled "INTERNET PACKET PROVENANCE TO VERIFY PACKET VALIDITY AND CONTROL PACKET USAGE" filed on Jul. 8, 2022.

TECHNICAL FIELD

The present disclosure relates generally to Internet communications, and more particularly, to security and/or privacy of Internet communications through verifiable packet source identity and provenance, and the policy-controlled usage of Internet packets, integrated directly within a secure and packet-identity-aware communications tunnel.

BACKGROUND

The Internet includes various privacy and security concerns, such as communication of transactions over the Internet. A basic building block of the Internet is the datagram, which is the digital packet of information that is transmitted over the Internet. Commonly referred to as "packets", these digital bursts of information are communicated across the Internet via numeric Internet Protocol (IP) addresses that designate the endpoint locations of the sender and the recipient of the packet. In order for IP addresses to be identified by the routing mechanisms of the Internet, they cannot be encrypted, making them accessible to anyone monitoring Internet traffic. Consequently, IP addresses may be purloined, imitated, and/or otherwise compromised to deliver different forms of unwanted packet traffic, malware, fraud, and/or other security threats, such as ransomware. IP address imitation can make the good packets indistinguishable from the bad packets—more than 90% of all packet traffic can be unwanted or dangerous—and that problem is the root cause of the multi-billion-dollar Internet crime wave, now the third largest industry worldwide.

Unfortunately, packets have no identity other than those two numeric IP addresses, which are untrustworthy. By lacking verifiable identity and being communicated without reliable provenance, the entire Internet security industry is based on largely indeterminant methods to discern the validity of packets, including but not limited to deep packet inspection, white and blacklists, and firewall tables that use only IP addresses, which are easily spoofed.

Additionally, end users may desire protection against ransomware, phishing, and other forms of Internet fraud. Internet fraud generally refers to types of fraud that use one or more online services, such as chat rooms, e-mails, message boards, websites, etc., to present fraudulent solicitations to prospective victims, to conduct fraudulent transactions, and/or to transmit the proceeds of fraud to financial institutions or to others connected with the fraudulent scheme. Attempts to address the growing number of incidents related to Internet fraud include legislation, user training, public awareness, anti-virus software and increasingly complex technical measures. End users may also desire protection against malicious/destructive attacks that can cause damage to the end user, but may not necessarily have a direct economic motivation (e.g., distributed denial-of-service (DDoS) attacks, attacks on critical infrastructure, attacks to pursue political advantage, etc.)

Standard Internet communications and many security methodologies may utilize Internet packets that lack verifiable identification information. The identity of a standard Internet packet may be assigned a numeric IP address of the computer, device, server, or other network resource from which the packet originated, where the IP address may be included in the packet header, which may be unencrypted. A generally held and common practice is that numeric IP addresses that serve as the basic routing mechanism of the packet over the Internet are not encrypted, masked, or otherwise hidden from public view. Consequently, IP addresses may be purloined, imitated, and/or otherwise compromised to deliver different forms of unwanted packet traffic, unsolicited advertising, malware, fraud, and/or other security threats, such as ransomware.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method includes receiving, at an encryption tunnel, a packet including an indication of a source from which the packet originated, the packet being encrypted with a first layer of encryption; generating a passport to accompany the packet encrypted with the first layer of encryption, the passport being a data file including information to validate the packet; encrypting the passport and the packet with a second layer of encryption that provides a multi-tiered encryption stack for the packet; and outputting, from the encryption tunnel, the passport and the packet encrypted with the second layer of encryption.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DESCRIPTION OF THE DRAWINGS

FIG. 9A-9B illustrate example IAF packets.

DETAILED DESCRIPTION

Figure 1:
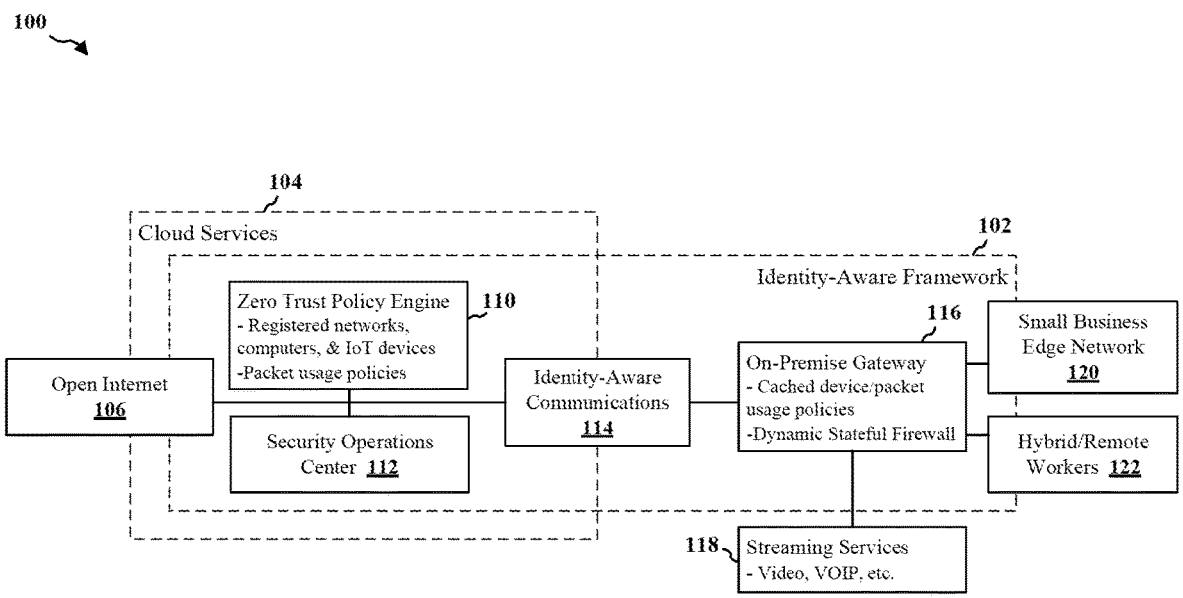
FIG. 1 is a diagram illustrating an example of an identity-aware system.

An Identity-Aware Framework (IAF) for secure communications across the open Internet by providing, at the edge network, a hardware Gateway (e.g., an industry standard router with embedded IAF software) or IAF software stored on fixed or mobile endpoint devices, may establish and maintain an on-demand encrypted channel with other IAF networks and the cloud-based IAF administrative and communication services. The identity and provenance details of all computers, servers, mobiles, and internet-of-things (IoT) devices and other computing resources on the protected edge network may be detected and captured as well as storing those details on central computing services, and caching them at endpoints, while adding additional packet routing and usage policies to provide precision control of IAF packet traffic.

Packets generated by application and utility software on computers, servers, IoT and mobile devices, cloud services and other computing resources may be captured at endpoints, appending to those packets, before they are encrypted and transmitted across the secure IAF network, the IAF Provenance Passport (Passport). The Passport is a data file of unique IAF format including: 1) the verifiable identity and provenance of the packet-source computing device, by inference of the computer user, the source network, and other packet identity details, 2) the packet policies and usage details that inform the IAF network routing components of the local and remote computing resources with which the packets may or may not interact, and 3) the IP addressing, ports, encryption keys and other details to enable secure two-way encrypted communications between endpoints within the secure network, with or without reference to central cloud provenance, policies or packet routing resources.

The Passport provides, directly within the encrypted IAF tunnel, the verifiable packet identity, provenance and usage policies such that the IAF tunnel is itself packet-identity-aware, operating directly on the provenance and policy detail provided within the embedded Passport. That is, a significant improvement is provided over prior encrypted tunnel schemes (e.g., virtual private network (VPN), the onion router (TOR), secure sockets layer (SSL), transport layer security (TLS), etc.) that do not provide any embedded packet provenance for validation, or usage control over the packets they transmit, and that may or may not be pre-established and left open and continuously available to packets from both known and unknown sources, providing an attractive target for attackers.

The IAF employs nested layers of encryption, enabling the IAF packet management software to extract and decrypt the Passport at midpoints or endpoints, to manage encrypted packet routing and usage, without the entire packet payload and attachments being decrypted until they have reached their intended destination. Receipt of the packet at its destination is based on the attached Passport, decrypting the encrypted Passport to extract the provenance information for the packet, validating the packet based on whether the provenance information for the packet corresponds to the centrally-referenced or locally cached indication of the computing resource from which the packet originated, and routing the packet to its destination under the usage policies provided by the IAF or within the Passport The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects are presented with reference to various apparatus and methods. These apparatus and methods are described in the following detailed description and illustrated in the accompanying drawings by various blocks, components, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip, baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range from a spectrum of chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. Techniques described herein may be practiced in a wide variety of devices, chip-level components, systems, distributed arrangements, aggregated or disaggregated components, end-user devices, etc. of varying sizes, shapes, and constitution.

The Internet is a worldwide, publicly accessible series of interconnected computer networks that transmit data by packet switching using a standard Internet Protocol (IP). For example, the Internet may be regarded as a network of networks that includes numerous smaller domestic, international, academic, business, and government networks, etc., which together carry various information and services, such as electronic mail (email), online chats, file transfer, interlinked webpages, and other resources of the World Wide Web (WWW).

The Internet includes various privacy and security concerns, such as communication of transactions over the Internet. For example, end users may desire protection against ransomware, phishing, and other forms of Internet fraud. Internet fraud generally refers to types of fraud that use one or more online services, such as chat rooms, e-mails, message boards, websites, etc., to present fraudulent solicitations to prospective victims, to conduct fraudulent transaction, and/or to transmit the proceeds of fraud to financial institutions or to others connected with the fraudulent scheme. Attempts to address the growing number of incidents related to Internet fraud include legislation, user training, public awareness, anti-virus software and increasingly complex technical measures. End users may also desire protection against malicious/destructive attacks that can cause damage to the end user, but may not necessarily have a direct economic motivation (e.g., distributed denial-of-service (DDoS) attacks, attacks on critical infrastructure, attacks to pursue political advantage, etc.)

The technical measures include "Zero Trust Network Access" (ZTNA), which is being widely adopted by the security industry. ZTNA refers to a loosely codified industry methodology that utilizes a suite of interrelated technologies to achieve an increased level of trust for Internet traffic that has been verified by an internal or external "trusted" resource. ZTNA environments may be difficult, complex, and expensive to implement and maintain and are, therefore, primarily implemented by larger enterprises that have the staff and financial resources to take advantage of ZTNA. Due to technical complexities and costs, ZTNA and other enterprise-level security methodologies may not be practical for networks of smaller businesses and personal residences.

However, security methodologies associated with the Internet may utilize Internet packets that lack verifiable identification information. The identity of a standard Internet packet may be assigned a numeric IP address of the computer, device, server, or other network resource from which the packet originated, where the IP address may be included in the packet header, which may be unencrypted. A generally held and common practice is that numeric IP addresses that serves as the basic routing mechanism of the packet over the Internet are not encrypted, masked, or otherwise hidden from public view. Consequently, IP addresses may be imitated and/or otherwise compromised by anonymous sources to deliver different forms of unwanted packet traffic, unsolicited advertising, malware, fraud, and/or other security threats, such as ransomware.

Based on the nearly anonymous nature of IP addresses in packets, a large quantity of Internet traffic may be unwanted by an end user. As a result, the packet and the unencrypted/unverifiable IP address may be universally untrusted and may provide a main point of attack for cyber-vulnerabilities. Such security risks may result in regular programmatic and human monitoring to achieve only partially successful fraud remediation, and may contribute significantly to the billions of dollars of cybercrime losses that occur annually on a worldwide basis.

As the IP address may not provide a centrally verifiable packet source identity and may lack a means to otherwise verify the source of a packet, Internet security practitioners and monitoring technologies may not deterministically differentiate between safe packets and threats. Consequently, some enterprises may operate in a defensive mode, fighting minute-by-minute battles against thousands of zero-day and other threats. Security for smaller businesses and home networks may be limited to packet filtering based only on IP addresses at router firewalls and anti-virus software on desktop computers, servers, and handheld devices, the combination of which may now be less than 25% effective.

FIG. 1 is a diagram 100 illustrating an example of an identity-aware system. Trends in the Internet security space may be based on identity-centric security associated with ZTNA (e.g., a never trust, always verify model). ZTNA may be based on interrelated concepts of durable credentials, least privilege access, user authentication, user and network behavior, network micro-segmentation, artificial intelligence (AI) and machine learning (ML), and other methods for verifying the identity of users and connections, to determine a least dangerous routing and usage of packets. ZTNA is a methodology of many components, and may not be a technology.

The ZTNA and other security models may be directed largely toward determining the identity of users, application files, network components and other elements, all of which may be foundational components of a Zero Trust security model, but ZTNA does not as yet include the identity and provenance of the packet itself. Lacking identity beyond IP addresses, packets may continue to remain untrusted, and ZTNA models and other security efforts may be non-deterministic. In other words, even traffic from presumably trusted sources may provide no guarantee that the packet is legitimate.

The identity of the packet may be a missing component in the ZTNA and other security models. Utilizing packet identity for increased security may be based on a verifiability of a packet source, the source network, computer or device, and by inference the user of that source. Although there may be thousands of security companies, billions of lines of code, billions of dollars spent on security applications and operations centers, millions of high-priced security personnel, and trillions of dollars lost to cybercrime, verifiable packet identity and by inference the actual sender of the packet remains universally absent from the Internet security space.

A lack of verifiable packet identity may be a root cause of incidents of cybercrime, as the IP address of a packet may not serve as a credible identity. While packets may be a foundational technology of the Internet, such packets may have no identity other than an IP address. Further, the IP address may be associated with an anonymous source and/or may be compromised, as packets may transit the Internet with no verifiable identity of the source of the packet, its originating network and device and by inference the packet sender.

A lack of verifiable credentialed identity may enable online threats, email spam, instances of malware, unsolicited advertising, and other forms of compromised and unwanted traffic. Without a technique for verifying a true device, network and sender source of the packet or other credentials, standard packets may be anonymous. Desirable packets may be indistinguishable from undesirable packets.

Packets may transit a global cloudscape without verifiable packet information, where protection to the end user may be based on router firewalls of smaller networks using only the IP address, anti-virus software, etc. For billions of Internet of Things (IoT) devices, there may be decreased protection against undesired traffic. Entities that employ ZTNA methodologies and other security procedures may achieve increased effectiveness in security procedures. Yet, conventional security techniques, ZTNA methodologies, etc., may not yet provide packets with a verifiable source identity.

Packets with a verifiable source identity may increase security. Although packet identity verification is not presently a feature of ZTNA and other security models, implementing verifiable identity procedures for packet traffic in a robust communications environment may increase security. A packet with a verifiable identity and packet usage provenance may dramatically improve security effectiveness in aspects associated with Internet security models. That is, a much higher percentage of confidence of packet validity may be achieved based on provenance information and/or allowed usages indicated in association with the packet and/or a centrally verifiable database at Identity-Aware Framework (IAF) cloud services and at endpoints. In fact, a network that operates under the principals of packet identity-awareness may experience a reduction of threats given that packets without provenance credentials may be automatically rejected. Identity-awareness may be achieved based on binding the packet to the verifiable identity of the network, computer or device, and by inference the user, from which the packet is sourced, encoding the packet with provenance information that may be used to confirm and manage packet validity, routing and usage protocols, creating a trusted environment within which packets without provenance information may not be allowed to transit the protected network.

The infrastructure for identity-aware communications 114 may be based on more than embedding source identity in a packet. For example, a cloud-based device or computer provenance database may be utilized to verify the legitimacy of local network originating packets at network midpoints and endpoints. Verification may be accomplished through the Identity-Aware Framework 102 that may extend a local edge network (e.g., small business edge network 120) via edge network gateway services or the IAF endpoint client software through an encrypted tunnel to protective IAF cloud services 104. Such an architecture may also isolate inbound threats to the IAF central cloud services 104 before the threats reach the local network.

Passport and usage policies/protocols may allow packet traffic access to be controlled at a granular level, such as individual computing devices, IoT devices, machine sensors, etc., and may allow authorized websites and other connections to legitimately interact. Insofar as local packet traffic is managed at edge network hardware or software gateway services, IAF client software may or may not be required on computers and devices that are upstream from the edge network gateway services. The Passport and related usage policies may provide security to not only the network computers, but to billions of IoT devices that have heretofore been unable to achieve such security.

Legitimate packet sessions may originate from application software (e.g., email, websites, social media, etc.) on computers and devices within a protected network. The computers and devices may be within the small business edge network 120 and/or operated by hybrid/remote workers 122. The Passport may be utilized at edge network gateway services 116 or endpoint devices for requesting packets outbound to the Internet 106 and may be retrieved and/or assembled dynamically from a local cache of a central policy engine 110. An on-premise gateway 116 may be associated with cached device/packet usage policies and/or a dynamic stateful firewall. The packets may transit securely to the IAF cloud services 104 where embedded information may indicate which websites or other resources may be accessed on the Internet 106. Packets returning to the cloud 104 in response to originating application requests may be similarly checked for provenance and may be validated or rejected. Validated packets may be vectored to a security operations center 112 for threat detection and mitigation, and may be subsequently sent securely to the edge network gateway services 116 or endpoint devices. At the edge network gateway services 116, or endpoint devices packets with identity-aware framework credentials (e.g., identity-aware communications 114) may be validated, while packets without IAF credentials may be rejected. Packet usage protocols may allow the packets to be delivered to allowed/authorized computers and devices, such as at the small business edge network 120 and/or the hybrid/remote workers 122.

Identity-aware techniques, which may be associated with or referred to as the IAF 102, may secure edge network traffic by adding the Passport and/or by operating in an encrypted tunnel between edge network gateway services 116 or IAF endpoint devices and a set of policy-based IAF cloud security services 104. Individual Passport features may secure computers and IoT devices on edge networks of any size or configuration.

The tunnel may be viewed as an encrypted and secure outer pipe, generated based on an independent packet session, which may be referred to as an IAF tunnel, that receives whole packets at one end, verifies source identity, applies dynamic policies/protocols for management and use, and outputs the packets at the other end in an original form of the packet. With or without any client-resident watchdog software, the IAF tunnel and associated software may secure computers, mobile and IoT devices on the edge network while rendering the network invisible to unqualified traffic from the open Internet 106.

The IAF 102 may be perimeter agnostic and may operate in the cloud 104 independent of dedicated endpoints, such that packets may transit freely through routers, firewalls, and across public or private networks. The IAF encrypted tunnel may allow a unique identity-aware Passport that provides an increased degree of control over the movement of packets and may serve as a routing and usage filtering mechanism at both the edge network gateway services 116, on IAF enabled endpoint devices and the IAF cloud services 104.

The tunnel may be an ephemeral tunnel that exists only during a packet session. The tunnel may not have dependencies on a pre-established encryption tunnel, such as a virtual private network (VPN) or The Onion Router (TOR). A combination of transmission control protocol (TCP)/IP or other user datagram protocol (UDP) stack, proxy services, stateful firewalls at the edge network gateway services 116, on IAF enabled endpoint devices and IAF cloud services 104 may be used to manage IP addressing during the packet session. The IAF tunnel may be a one-time TCP/IP or other protocol session generated to encapsulate originating application (App) packets in their entirety with or without modifying, caching, fragmenting, or proxying the original App packet payload, headers, trailers or IP addressing. At a completion of the IAF tunnel session, the packet may be output from the tunnel in a same form, protocol, and/or state as the packet was input to the tunnel, and the IAF tunnel session may or may not then be dissolved.

IAF packet management models may presume that legitimate IAF network traffic originates at the computing resources on the edge network. For example, email call requests for post office protocol 3 (POP3) and internet message access protocol (IMAP) responses from an email server, etc., web browser requests for web pages, and streaming services 118, such as gaming, video, voice over internet protocol (VOIP), etc. may be called from local devices via the edge network gateway 116. IP traffic originating from the cloud back to the IAF cloud services 104, that is NOT the return traffic of application-originating calls at a protected edge network, may be presumed as rogue traffic and may be trapped/isolated at the policy/protocol server, which may block access to the edge network gateway and IAF enabled endpoint devices services and the potential threats to local computers and devices. Direct IP address attacks on the edge network gateway services 116 may be similarly trapped.

Edge network gateway 116 and endpoint device services refers to a robust router, or edge network endpoint IAF software client, where packet traffic within the local network and/or subnets may be controlled by the combination of provenance awareness of the IAF packets and a stateful firewall of the edge network gateway services 116. The edge network gateway services 116 may eliminate certain uses for client software on edge network computers and IoT devices. While some installations may include one instance of gateway services, the system may accommodate addressing to support different configurations of subnets or individual gateway or device services upstream. Cloud services 104, such as IAF cloud services, may be comprised of a policy engine 110, the software that manages cryptography cycles and the IAF tunnel, a customer relationship management (CRM) system, website services, and web-based customer and technical services access for packet usage policy control. The policy engine 110 may be a Zero Trust policy engine associated with registered networks, computers, and IoT devices as well as packet usage policies. An IAF policy server may trap, clean, and pass to the gateway services 116 inbound email, web, and other traffic. For example, the inbound traffic to the IAF cloud services 104 may be vectored to a Security Operations Center (SOC) 112 before the traffic is passed over the IAF 102 to the edge network gateway 116 or other endpoint device services.

A policy engine 110 may operate at the IAF cloud services 104. The policy engine 110 may manage white-list usage policies of computers, IoT devices, and other resources on a local network behind the edge network gateway services 116, and may control access to resources on the open Internet 106. Usage policies for the local network may be established and driven by a combination of pre-established rules for common computers, devices, and network configurations, the manufacturer usage description (MUD)—request for comments (RFC) 8520, profiles for IOT devices, and/or specific resource usage parameters specified by the user through a web interface. Policy rules for a network may be periodically updated via a command channel to a local cache in the edge network gateway services 116. The local edge network gateway services cache may drive the edge network gateway services stateful firewall white-list rules to control access and routing of local area network (LAN) or wide area network (WAN) packet traffic. Usage policies for traffic outbound from the IAF cloud services 104 may control the white/black-lists that allow or restrict traffic to and from the Internet 106. The SOC 112 may be associated with services that are provided as a part of IAF cloud services 104 or contracted from one or more third parties. Packets inbound to the IAF cloud services 104 from the Internet 106 may be verified for proxy address verification and usage policies. Inbound packets that are not verifiable as the returning packets of originating App packets may be rejected. Qualified packets may then be vectored to the SOC 112 for managed detection and response (MDR) and sent to the edge network gateway services 116 through an IAF tunnel.

App packets correspond to packets that originated at application software on computers and devices as well as the state of the App packet as the App packet transits across the local network to and from the edge network gateway 116 or endpoint device services, and from the IAF cloud services 104 to and from the Open Internet 106. Originated App packets that reach the edge network gateway services 116 or IAF endpoint devices may initiate the IAF tunnel process. Returning packets transiting from the edge network gateway services 116 to the local network may also be referred to as App packets. The App packets may be encapsulated in an original form within the stand-alone IAF tunnel packets and may be communicated unmodified between the IAF cloud services 104 and the edge network gateway services 116 or IAF endpoint devices. Returning App Packets refers to App Packets that are being communicated back to the IAF cloud-based proxy connection or IAF endpoint devices from Internet-based resources, such as web sites, email services, etc. in response to originating App packet calls from the local network or IAF device.

IAF packet refers to packets that are communicated under the control of the IAF edge network gateway services 116 or IAF endpoint devices and the encrypted IAF tunnel in either direction between the edge network gateway services 116 or IAF endpoint devices and the IAF cloud services 104. IAF packets may be generated packets for the IAF session. IAF packets may encapsulate App packets in their entirety and may or may not manipulate or modify the original App packets. IAF packets may carry added Passport information. IAF tunnel refers to a managed and encrypted tunnel generated by the IAF multilayer cryptography stack and client/ server software operating between the edge network gateway services 116 or IAF endpoint devices and the IAF cloud services 104. The IAF tunnel may be regarded as a secure outer pipe that receives packets of any protocol at one end, verifies source identity, applies dynamic policies to the management and use associated with the Passport, and outputs the packets at the other end in the original form of the packet. A command channel refers to an Internet communication session of a single or multiple layers of encryption. The command channel may be used for internal procedures between the edge network gateway services 116 and the IAF cloud services 104. The command channel moves updates to the edge network gateway services policy cache, controls the opening and closing of IAF tunnel traffic ports, and carries other operational commands that may not be a part of the IAF packet data channel.

Passport refers to an IAF packet structure that embeds Passport information in the IAF packet sessions communicated over a multi-layer cryptography stack. The Passport provides each packet with information that the edge network gateway services 116, endpoint devices, and policy server application layers use to control packet usage and relationships between IP addresses, uniform resource locators (URLs), computers, IoT devices, subnets, applications, and other parts of the local or remote network. The Passport may also control the access of local originating traffic to cloud resources. By applying the Passport to inbound packets, which may be referenced from the policy engine 110 or a local cache, the system may determine whether a packet is authorized to transit the IAF system. If so, the packet may be communicated for additional processing. If not, the packet may be terminated at the policy server. The Passport may be used to provide verifiable packet identity beyond the source device IP address which, alone, may not be trusted. By encapsulating the source device media access control (MAC) address and other packet source provenance information within the Passport, a true identity of the packet source network, computer or device and by inference, the actual user, may be verified at end points and policies/ protocols may be applied to control packet usage. The IAF Passport may be a string of packet identification and usage policy information that may be provided by the local or IAF cloud services device and usage policy cache. The Passport may be used as the mechanism that associates the individual packet with the network, computer or device from which the packet originated, which may allow for verification of packet validity at midpoints and endpoints. The Passport may or may not be encrypted and added to the outbound IAF packet prior to the final cryptography session, and may be exposed (and decrypted if encrypted) when the final cryptography session is decrypted at endpoints.

MUD refers to a protocol that provides for URLs being embedded by the IoT device manufacturer within IoT devices (e.g., MUD-RFC 8520). MUD may provide one or more recommendations of the manufacturer regarding IoT device usage and control. The IAF 102 may reference MUD files to populate the local network and outbound packet usage policies.

Standard Single-layer encryption techniques (e.g., VPN, C3, hypertext transfer protocol secure (HTTPS), etc.) may be subject to malicious or accidental key disclosure, brute force attacks, and/or evolving exploitations. Accordingly, a multi-layer encryption stack may provide increased protection against attacks, such as man-in-the-middle and quantum cryptography attacks. Multiple nested encryption layers with out-of-band key exchange or included in the packet may generate a fragmented and obfuscated stack that may be empirically and mathematically beyond the capabilities of many human and machine-driven attacks. Any of the multiple encryption keys that may be discovered are of no use to an attacker, because without decrypting all layers of the cryptography stack with all the correct encryption keys in the proper sequence, the payload and header metadata remains encrypted. To compromise an IAF packet, the outer cryptography 3 (C3) layer must first be decrypted. However, the intermediate cryptography 2 (C2) encryption layer that includes the cryptography 1 (C1) encryption layer and the Passport may remain encrypted. If the intermediate C2 layer can be decrypted in the proper sequence, only the encrypted file is revealed for the C1 innermost third layer. An automated brute force key decryption attack on the outer and intermediate layers may be defended against, because even having decrypted all outer layers, which may be unlikely, the attacker will still be presented with the encrypted C1 symmetric inner layer. Thus, the attack may run indefinitely without success. Further, discovery of the C1 symmetric key alone may be useless without having previously decrypted the outer layers.

System installations and configurations of the edge network gateway services 116 or endpoint devices may allow the edge network gateway services 116 or endpoint devices to connect to the IAF cloud services 104, verify customer accounts, and automatically establish proxy addressing to instantiate and maintain the IAF tunnel with the IAF cloud services 104. User-intuitive edge network gateway services management software may automatically discover local wireless and wireline devices and may present a website to coach the end-user through connecting to the edge network gateway services 116 and the approval of devices, applications, users, etc., with which the devices may or may not interact. The process may be a non-technical, table-driven process that may be performed by the user. Upon discovery of a newly installed IoT device, the MUD profile for the device or device type may be automatically retrieved from the MUD profile database, the local cache or the policy engine 110 and instantiated as the base operating policy for the device. Instructions may be presented to the user for approval of the default configuration or a user-modified connectivity configuration. When an IAF network is established, or a device is newly connected to an existing network, the user may not be expected, on their own, to initiate the session to configure or maintain the network policies and device connectivity. Dedicated IAF administrative client software may not run on endpoint devices, which may reduce the effectiveness of an automated on-screen message system maintenance prompt. However, an email or text message to the administrative account for the network (e.g., with a link to the user account website and edge network gateway services configuration) may guide the user through the process. The process may be ongoing so that newly connected devices may be actively configured, and improper security exposure may be prevented.

Packets communicated within the IAF 102 may use the IAF 102 to encapsulate and manage packets of different formats and protocols. Packet encapsulation may include variations of TCP/IP, UDP, internet control message protocol (ICMP), multiprotocol label switching (MPLS), software-defined (SD)-WAN, quick UDP internet connections (QUIC), and other protocols, data or streaming, along with IP version 4 (IPv4) and IP version 6 (IPv6) addressing. Packets may be unencrypted or encrypted, such as for HTTPS.

For edge network gateway services packet management, three or more types of traffic may be received at the edge network gateway services 116 from the protected local network or the cloud 104. A first type of traffic may correspond to App packets originated at computers and IoT devices on the protected local network, or upstream subnets or devices. A second type of traffic may correspond to IAF qualified, cryptographic formatted returning App packets that arrive from the IAF cloud services 104 with the proper IAF structure and Passport. A third type of traffic may correspond to unqualified traffic that is received unrequested to ping ports, test IP addresses, and may attempt direct attacks (e.g., ransomware, malware, etc.).

Local packets outbound at the edge network gateway services 116 may correspond to packets originating on the computers, mobile and IoT devices on the edge network, where the originating domain name services (DNS) call synchronization/acknowledgment (SYN/ACK) handshake may be trapped and the session type may be checked. For local network traffic, the provenance may be usage checked and the packets may remain unencrypted. The packets may be routed directly through the stateful firewall back onto the local network, which may allow local connections based on locally cached authorization. For IAF cloud traffic outbound to the cloud, after the originating DNS SYN/ACK call is trapped, the packet usage provenance, including destination IP address, source MAC address, other provenance criteria and usage policies, etc., may be retrieved from the local policy cache and applied as the Passport. Concurrently, the public key for the Cryptography 2 public key infrastructure (PKI) session may be retrieved from the local cache. The tunnel process may single or double encrypt the packet payload, append the Passport, and communicate the assembled IAF packet to an outer layer cryptography session for transmission to the cloud services 104, or IAF endpoint devices which may provide more or less than three layers of encryption in transit. If steaming traffic is policy approved for direct streaming by a known protocol or service, the originating DNS SYN/ACK call may be passed through and the traffic may be directly vectored to the host streaming services on the open Internet 106, bypassing the IAF tunnel. Streaming traffic with less-trusted streaming service policies may also be vectored through the IAF tunnel.

Returning packets inbound at the edge network gateway services 116 received from the IAF cloud services 104 may first be decrypted from the outer cryptography session to reveal the Passport. An analysis of the packet format and Passport may separate valid IAF packets from invalid packets. Invalid packets may be blocked, quarantined and logged. Using the Passport and/or locally cached usage policies, the routing and packet controls may be set up. The remaining layers of encryption may be decrypted to terminate the IAF session, and the packets may be sent to local computers and IoT devices based on policies and profiles. Packets arriving at the primary edge network gateway services from the IAF cloud that may be targeted to IAF subnets or upstream edge network gateway services or endpoint devices may be first decrypted from the outer cryptography session to reveal the Passport and leave the packet payload encrypted. The packets may be provenance checked for local network and subnet policies and then forwarded upstream within newly established IAF tunnel sessions.

IAF Cloud services packet management may be used for packets outbound to the Internet 106 as well as for packets inbound from the Internet 106. Outbound IAF Packets arriving at the IAF cloud services 104 from the edge network gateway services 116 or endpoint devices (e.g., at 120/122) may be decrypted from the outer cryptography session to reveal the Passport that may be used to block non-valid packets and establish the routing and controls of the packet for access and usage of downstream cloud services. The Passport may be cached in association with connection control services of the stateful firewall and the policy engine, and may be appended and applied to returning packet traffic. The remaining layers of encryption may be decrypted to terminate the IAF session, and the packets may be communicated to the cloud in an original native state. Packets received from the cloud 104 may correspond to either valid IAF returning traffic or invalid traffic. The packets may be checked against the connection control services of the IAF cloud proxy services and the cached Passport to confirm the validity of returning IAF traffic. Inbound packets that are cloud-originated and not verifiable as valid IAF traffic, or not otherwise allowed by IAF policies, may be presumed invalid and may be blocked, quarantined and logged. Upon packet approval, the IAF tunnel process may be initiated. The packets may be multi-layer encrypted, the cached Passport may be appended, the outer cryptography session may be initiated, and the packets may be sent to the edge network gateway services 116 or endpoint devices (e.g., at 120/122).

The Passport may serve as a primary protective element for an IAF packet. Data packets communicated within the IAF tunnel, including command channel packets, may have the Passport appended at packet origination. Without applying the Passport, the outbound tunnel packets may resemble ordinary packets without IAF provenance, which may be subject to security threats. Inbound packets returning from the cloud may also have the Passport appended at the IAF cloud services 104 before the packets are sent to the edge network gateway services 116 or IAF endpoint devices The Passport may provide for verification of valid IAF traffic. The Passport may be pulled from device and usage profile database records, or a local cache, and appended to packets just prior to the outer cryptography transmission session. The Passport may be revealed when the outer cryptography session is decrypted. If packets are received at either end of the IAF tunnel, the presence or lack of the Passport may be the first test for the validity of the packet. The source IP address, the source MAC address and other provenance criteria may also be verified to further validate the inbound packet. If a hacker is able to compromise or imitate the Passport and the source IP address, as IP addresses may not be held fully private, the hacker may not be able to compromise the provenance criteria included within the Passport that is not publicly exposed. Exposure may allow static IP addresses of the tunnel to be discoverable. By embedding the Passport when an external packet arrives at the IAF cloud services 104, or back at the edge network gateway services 116, or IAF endpoint devices, the packet may be distinguishable from IAF qualified and non-qualified packets. The outer cryptography session may decrypt automatically at the inbound IAF services and, although there may be multiple payload cryptography layers, without the Passport in an IAF packet, an IAF packet may not be verifiable. The Passport, which may include the source device MAC address and other provenance criteria, may not be compromised, and may be compared at either end of the tunnel for IAF packet validity confirmation.

Edge network gateway services 116, IAF endpoint device software, and IAF cloud services firewall software may use device usage pointers within the Passport to call a device profile entry, which may be cached at the gateway services 116, at IAF endpoint devices or the IAF cloud services 104. The device usage profiles may be used to dynamically update the access control list (ACL) at the stateful firewalls to permit or restrict packet routing, the opening and closing of gateway and IAF cloud services ports, allowable file types, protocols, downstream URLs and IP addresses, etc.

Standard non-IAF router firewalls may result in limited management of inbound traffic. While the typical router gateway services may restrict only inbound traffic, the enhanced IAF gateway services may also have to be aware of outbound traffic from local computers and IoT devices (e.g., to trap the packet and dynamically apply the provenance to control packet session interaction with other local devices and downstream URLs and IP addresses). Implementation of a stateful firewall in the edge network gateway services 116 or IAF endpoint devices and at the IAF cloud services 104 may provide a more granular degree of packet management. Based on a user-accessible website that dynamically updates the device profile databases, the firewall may interact with the Passport and cached usage policies to control packet routing.

Edge network gateway and endpoint device services port controls may be based on the usage profiles called by the device profile. While edge network gateway services ports for email and web traffic inbound from local computers and devices must be kept open, IAF tunnel ports may be dynamically opened and closed during a packet session, kept open for returning traffic, or closed until the routing policies open the ports for returning traffic, etc. By having control over packet traffic, verified traffic may be communicated through the IAF tunnel and other traffic may be blocked, which may render the local network invisible to unqualified/invalid traffic.

The structure of the Passport may correspond to a concatenated string of information collected by the edge network gateway services 116. The checksum provided within the standard IP header may checksum only the headers and not the packet payload, which may allow a man-in-the-middle attack to revise the packet addresses and other packet contents undetected.

A master device profile database may reside at the IAF cloud services 104 as a global resource and may include device profiles and/or MUD profiles. The master device profile database may provide an initial baseline configuration from which a list of default network device configuration recommendations may be derived to apply to the device profile on edge network startup. The database may include the usage profiles of pre-loaded common devices as well as the recommended set of profile configurations for business, home, and other edge networks. Each device profile entry may correspond to a device-specific ACL of router commands that may be called to restrict or allow packet routing. The database may include the MUD device profiles, derived from the MUD URLs and pre-loaded from the publicly accessible databases of MUD URLs, and may correspond to devices attached to customer networks. A device type flag may be appended to the MUD usage profile and other profiles to control application of the profile to a class of devices or to restrict application of the profile to a specific manufacturer model. Such techniques may allow assigning a usage profile to devices that do not have an advertised MUD URL, but may correspond to a class of similar devices. For example, a pre-determined default profile may be utilized for a standard business computer, which may allow routing for normally allowed protocols and file types, such as email and browser protocols. Inbound executable (.exe) files and other potential threats may be allowed after a SOC analysis 112 and specific approval based on network and device usage policies.

The customer network device profile database may reside at the IAF cloud services 104 under the customer account. The database may include a list that profiles the computers, devices, and subnets on the network. The database may be populated from the master device profile database when an installation goes live and may be updated based on changes to the network. A copy of the device profile list and associated packet usage profiles may be cached at the edge network gateway 116 or endpoint device services and may be updated periodically or upon changes. Following receipt of a packet inbound from local devices, the edge network gateway services or IAF endpoint devices may reference the device and packet usage profiles to verify the validity of the packet, control routing of packets back onto the local network and, generate the Passport to append to the packets targeted to the IAF cloud services 104, which may be cached and applied to packets returning from the cloud to filter traffic before being sent back to the edge network gateway services 116 or IAF endpoint devices. The device profile database may correspond to the database from which the individual Passport is derived. Entries stored in the database may include, among other information: device profile usage flags, profile types, device-specifics or device types, control dates, the source machine provenance criteria that may be difficult to compromise due to the encrypted IAF channels, pointers to the packet usage profiles that may be referenced at edge network gateway services 116, endpoint devices and cloud services 104 to control authorized ports and connections, and other fields and values.

For the first layer of encryption, a symmetric key or other form of encryption key session (e.g., Cryptography1 or C1) may correspond to a key that may be machine generated for each packet cryptography session. After the packet has been encrypted, the key may be communicated via the command channel to the receiving end. The key may then be overwritten in memory based on being cached at the receiving end to be used to decrypt the Cryptography 1 session, For the second layer of encryption, PKI or other form of encryption keys (e.g., Cryptography 2) may correspond to PKI session public/private key pair sets that may be generated for an initial handshake to occur between the edge network gateway services 116 or IAF endpoint devices and the IAF cloud services 104. Two key sets may be utilized to originate IAF packets at the edge network gateway services 116 or IAF endpoint devices and at the IAF cloud services 104. Key sets may be generated, stored and maintained at the IAF cloud services 104, and updated to the edge network gateway services 116 via the command channel. The edge network gateway services public key may be cached at the edge network gateway services 116, while the edge network gateway services private key may be stored at the account PKI private key store. The IAF cloud services private key may be cached at the IAF cloud services 104, while the public key may be communicated via the command channel and stored at the edge network gateway services 116. The same key update and caching is employed for IAF endpoint devices The command channel may be differentiated from the multi-layer IAF data channel based on high-speed procedures, low latency, port management, unique cryptography, and other criteria. The command channel may also carry internal information and may be used to update edge network gateway services 116, ACL caches and semaphore details about IAF channel traffic. The command channel may also be used for an out-of-band channel associated with encrypted authentication matching. The command channel may operate as a single or multiple encryption layers of cryptography traffic on multiple ports based on a round-robin addressing scheme that remains open for command channel traffic. The IAF designated ports may be firewalled to receive IAF IP traffic from IP addresses and sending ports to reduce compromises, credential, and other port attacks. The IAF data tunnel session may or may not remain open for a sufficient amount of time to receive packet responses back from the initial destination.

The command channel may be used for port management of IAF channel traffic. The IAF port management may maintain IAF data tunnel sending and receiving IAF ports closed and only open the IAF ports based on specific calls from the sender across the command channel. An IAF-controlled packet time-to-live (TTL) may control individual packet traffic time-outs to override protocol layer TTLs. After the Cryptography 2 PKI session has encrypted the packet, but before the IAF packet Cryptography 3 session is initiated, an IAF port management TTL session timer may be set. The local sending IAF tunnel ports may be opened, and the command channel may be used to signal to the receiving end that the ports for an IAF data tunnel are to be opened (e.g., based on a round-robin IP addressing scheme). The IAF packet Cryptography 3 outer session may be initiated and the IAF tunnel session may be commenced. At the expiration of the IAF TTL, or upon completion of the IAF tunnel session, an IAF managed process may close the sending IAF tunnel ports and, through the command channel, may concurrently signal the receiving firewall to close the receiving IAF data channel ports, such that the IAF tunnel session may be dissolved.

Network configuration, device, and packet usage profiles may be maintained at the IAF central cloud services 104. Profiles may be periodically updated through the command channel to the local cache at the edge network gateway services 116, and may be applied to update the edge network gateway services ACL. Periodic updates may be performed to software on the edge network gateway services 116. The cryptography key generated during the Cryptography 1 cycle may be communicated through the command channel to the key storage at the packet destination. The command channel may also be used for miscellaneous communication of information between the cloud services 104 and the edge network gateway services 116.

The IAF tunnel may operate based on static IP addresses with or without the use of the public DNS. DNS calls made from originating application software may be trapped at the edge network gateway services 116, which may be used to determine the traffic type and set up the IAF tunnel. Streaming traffic may be passed directly to the Internet 106 and the DNS and subsequent packet traffic may be processed, while IAF qualified data packet sessions may be vectored through the IAF tunnel. DNS calls that exit the IAF tunnel at the IAF cloud services 104 may be trapped by the proxy services, which may establish and manage the proxy session that passes packets into and out of the IAF tunnel. Different types of example packets may transit over the IAF, some of which may have packet shaping by the IAF. The example packet types may include unencrypted TCP/IP, UDP and other packets, such as for email, web, HTTP, ICMP, MPLS, QUIC, utilities, etc.; HTTPS packets from web sessions and other applications, such as for online shopping sites, banking, etc.; encrypted (e.g., not HTTPS) packets from various application sources, such as VPNs, private email, social media, short message service (SMS), secure file transfer protocol (SFTP), private messaging services, anti-virus and security services, etc.; IAF formatted packets communicated within the IAF network; streaming packets, such as for video, VOIP, etc., that may be trapped at the edge network gateway services 116 and vectored directly to the Internet 106; and direct attack and various forms of threat and nuisance packets, such as for malware, DDoS, port pings, unsolicited advertising, phishing, viruses, trojans, spam, spyware, ransomware, structured query language (SQL) injection, mobile IoT attacks, etc.

Figure 2:
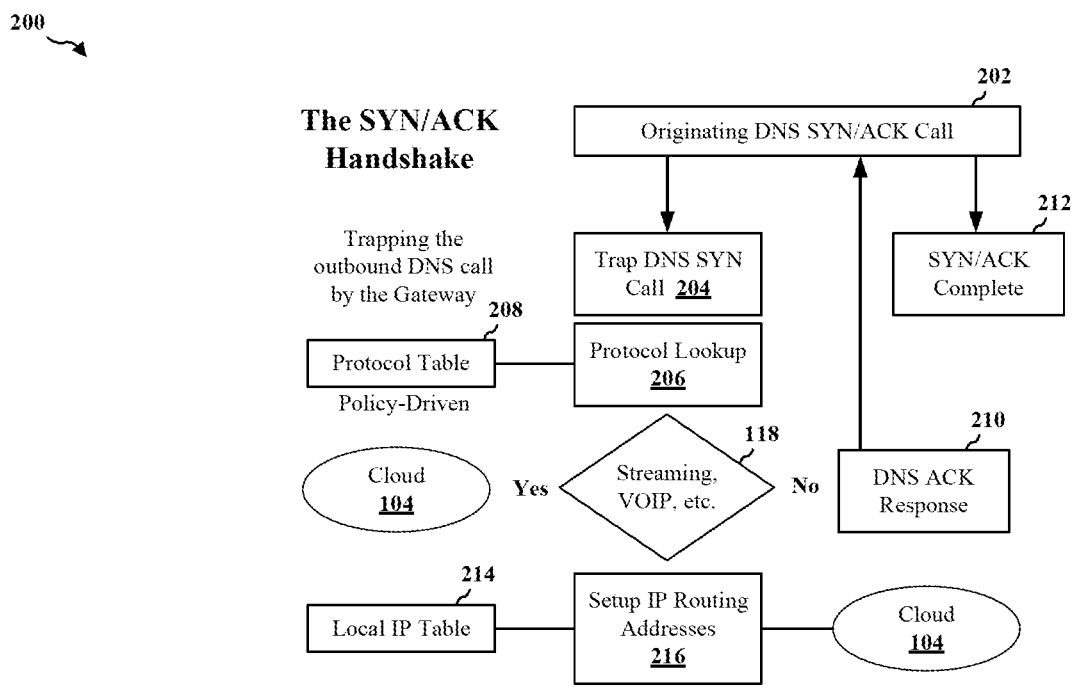
FIG. 2 is a flow diagram illustrating an example procedure for a synchronization/acknowledgment (SYN/ACK) handshake.

FIG. 2 is a flow diagram 200 illustrating an example procedure for a synchronization/acknowledgment (SYN/ACK) handshake. Packet transmission may correspond to a three-step SYN/ACK handshake based on waking up and establishing a remote connection. When the originating Domain Name Services (DNS) SYN/ACK call 202 arrives, the packet for the outbound DNS SYN call 204 may be trapped by the edge network gateway services or IAF endpoint devices. The protocol and data type may be referenced for data, streaming or other packet service types. For example, a protocol lookup 206 may be performed on a protocol table 208, which may be policy-driven, to determine 118 whether there is steaming, VOIP, or other types of traffic. Streaming traffic may be vectored directly to the Internet/cloud 104. A DNS ACK response (e.g., when there is no streaming traffic) may be returned to the source 202, which may reflect the source ACK back to the edge network gateway services or IAF endpoint devices to complete 212 the DNS SYN/ACK and allow the IAF channel to open. An edge network local IP table 214 may be referenced to setup IP routing addresses 216 and central service proxies for the Internet/cloud 104.

Figure 3:
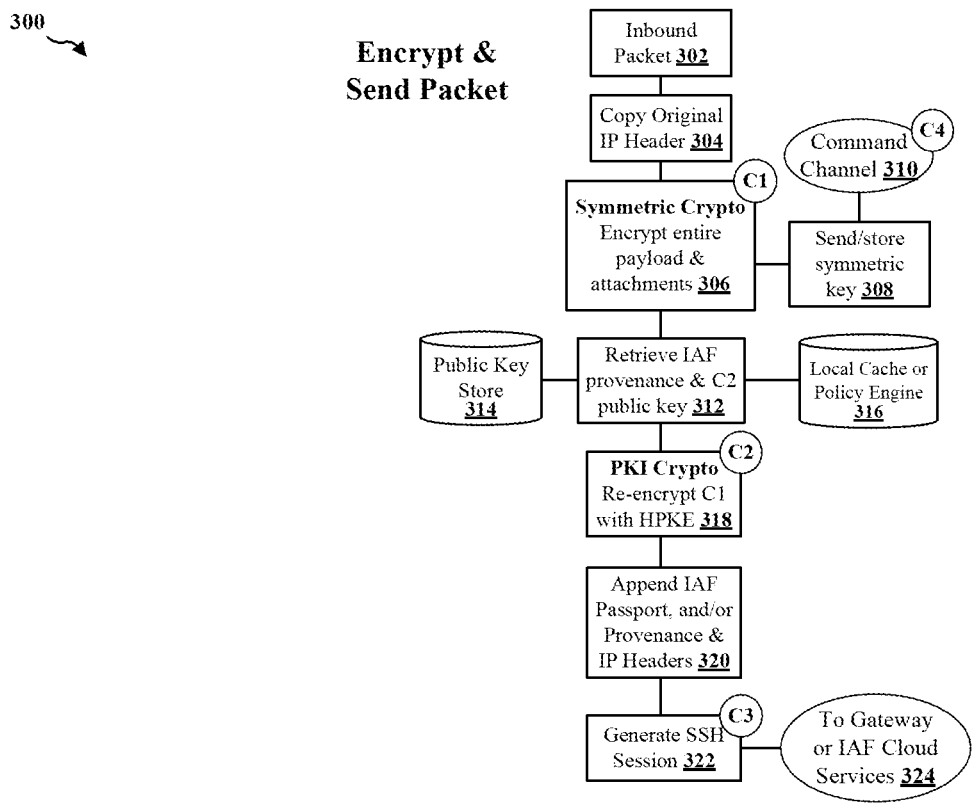
FIG. 3 is a flow diagram illustrating an example encryption and communication technique for a data packet.

FIG. 3 is a flow diagram 300 illustrating an example encryption and communication technique for sending a data packet. In aspects, the technique may be associated with a policy engine 316, edge network gateway services, or IAF enabled endpoint devices. A packet status may correspond to an ephemeral tunnel that may be active during transmission of an inbound packet 302. The packet may have no dependencies on a pre-established encryption tunnel, such as a VPN or TOR. Instead, the packet may rely on the IAF application software for the inner encryption cycles C1 and C2, and the C3 outer cryptography layer for transmission. The TCP/IP or UDP stack and the IAF cloud proxy services may manage the state of the IP addressing during the packet session. At the completion of the packet session, the packet may leave the tunnel in the same form, protocol, and state as when the packet arrived at the tunnel. The tunnel session may be subsequently dissolved. In some examples, the original IP packet header may be copied and cached 304.

After the DNS SYN/ACK handshake is complete, the packet/device provenance may be retrieved from the local cache 316. For Cryptography 1/symmetric crypto 306, the original payload, and attachments may be encrypted with a one-time-pad machine-generated symmetric key 308 or other cryptography method. The key 308 may be stored and subsequently sent/communicated via a C4 command channel 310 to be forwarded to a key store 314 at the receiving end. The local cache 316 may be called to retrieve 312 the edge network device IAF provenance record and the destination C2 public key. If expired, the cache 316 may be updated from the policy server. For Cryptography 2/crypto, the C1encrypted 306 Cryptography 1 file may be re-encrypted 318 with PKI (e.g., C1 with hybrid public key encryption (HPKE) or other form of encryption), such that the IAF Passport may be appended 320. The Cryptography3 protocol may be initiated on transmission, which may provide the outer and final encryption layer to the gateway, IAF endpoint devices or IAF cloud services 324.

Figure 4:
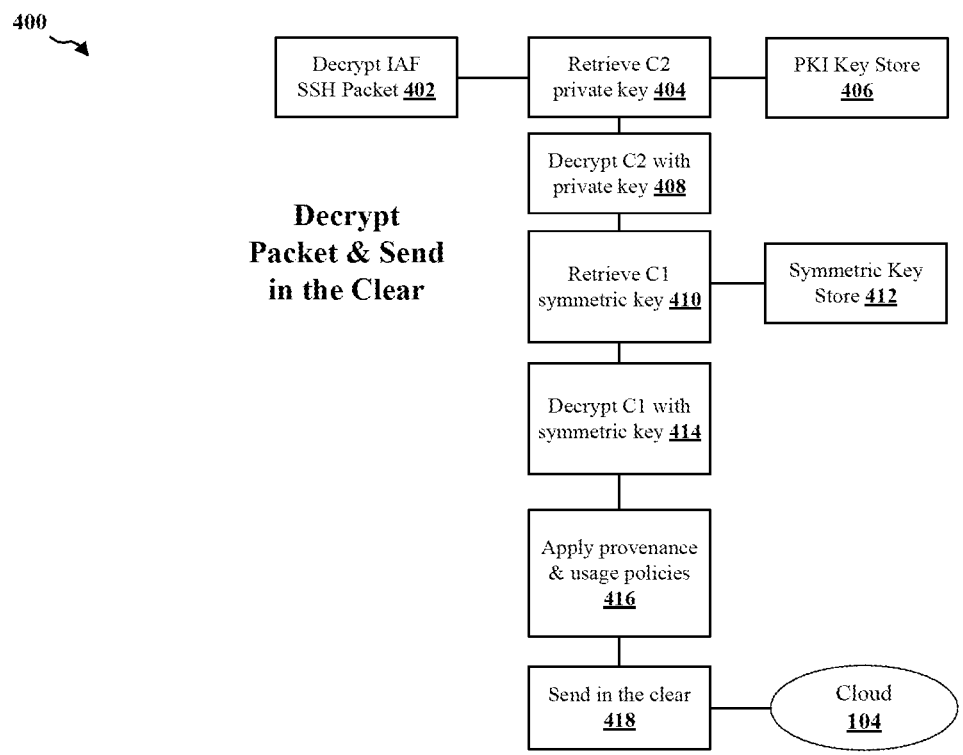
FIG. 4 is a flow diagram illustrating an example decryption and communication technique for a data packet.

FIG. 4 is a flow diagram 400 illustrating an example decryption and communication technique for sending a data packet in the clear 418 to the cloud 104. In aspects, the technique may be associated with a policy engine or edge network gateway services. A status of a packet may be based on when the packet arrives at either end of the IAF tunnel. Packets may be automatically decrypted to reveal the Passport for analysis, routing and policy management. After the packet is received, the outer cryptography session (C3) may be decrypted. For example, the IAF packet may be decrypted 402 The layer 2 PKI package C2 may be decrypted 408 with the private key. The C1 symmetric key may also be retrieved 410 from the key store 412 and the C1 file may also be decrypted 414 with the cached C1 key. Provenance and usage policies may be applied 416 to update firewall tables and manage packet routing. The packet is subsequently transmitted (e.g., sent in the clear 418) to the cloud 104.

Figure 5:
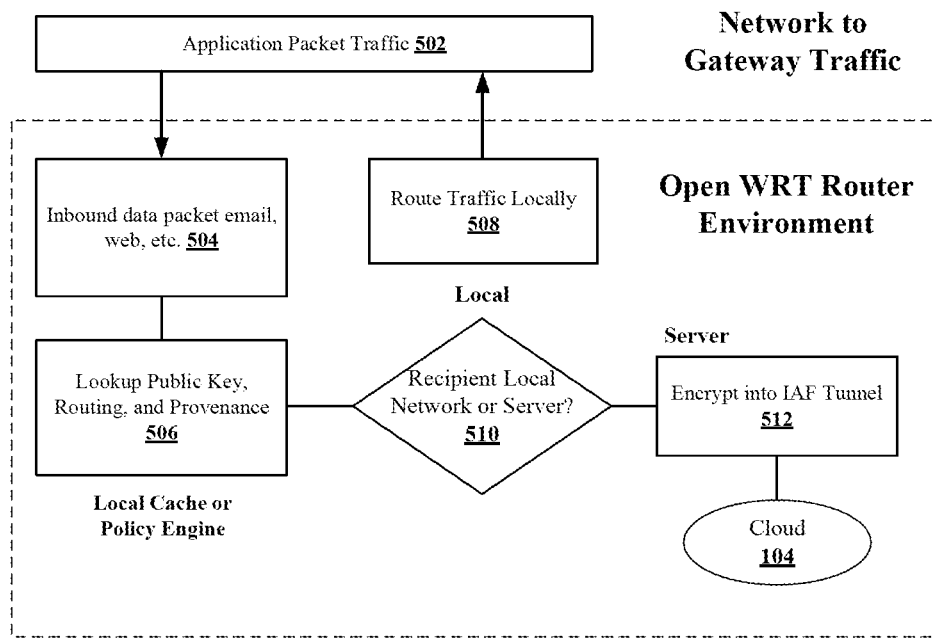
FIG. 5 is a flow diagram illustrating an example technique for processing packets arriving at edge network gateway services from edge network computing devices.

FIG. 5 is a flow diagram 500 illustrating an example technique for processing packets arriving at edge network gateway services from edge network computing devices (i.e., network to gateway traffic). In aspects, the techniques may be associated with edge network gateway services that are open with respect to a router environment. Such procedures may resolve local or IAF server traffic. After the DNS SYN/ACK handshake, the IAF packet transfer of application packet traffic 502 may be initiated. Inbound packets 504 (e.g., data packet email, web, etc.) may be received at the edge network gateway services, as HTTPS or other encrypted application formatted packets. The target IP address routing information, public key, provenance/MUD profile, etc., may be retrieved/looked up 506 from the local cache or policy engine. The recipient IP address may determine 510 whether the session is for a local network or for a server associated with external IAF server traffic. Local traffic may remain in an original form and may be routed 508 back to the local network devices based on local policies, usage provenance, MUD profile, etc. IAF cloud-destined traffic may be communicated to the server based on encryption 512 into the IAF tunnel via an outbound encryption process for the IAF cloud 104.

Figure 6:
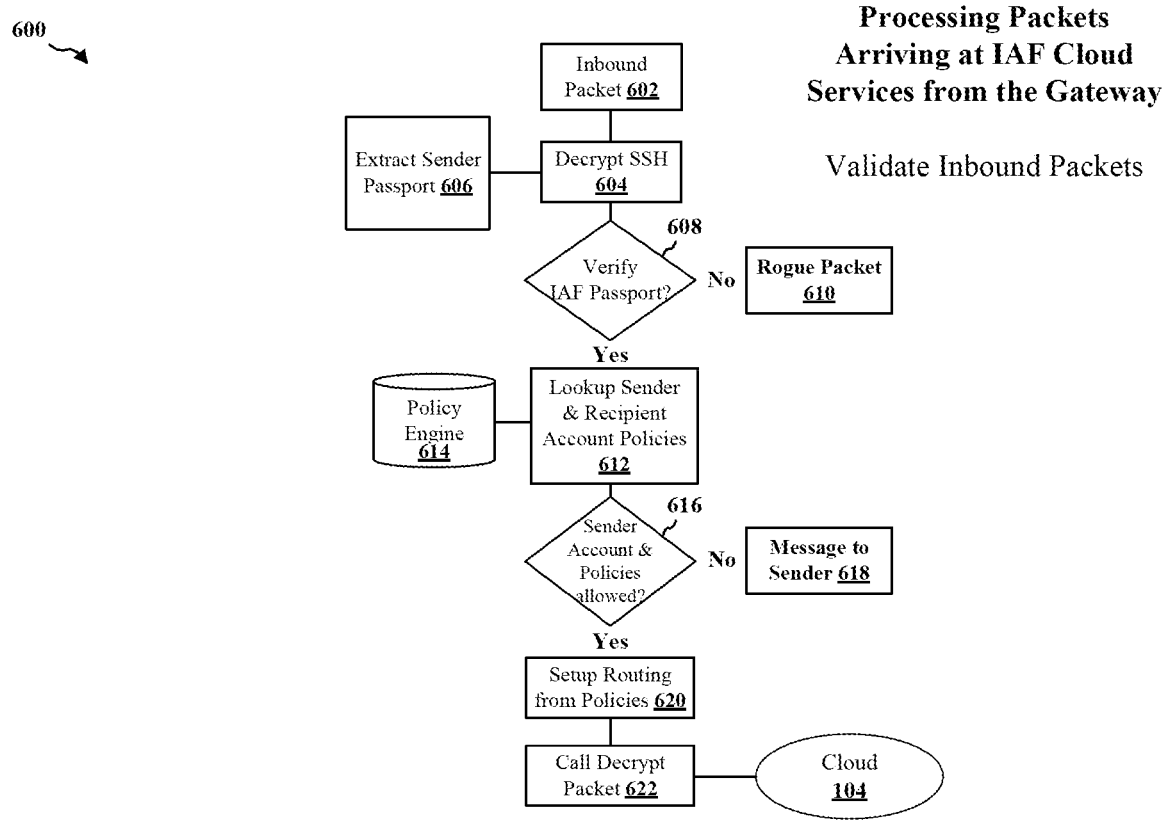
FIG. 6 is a flow diagram illustrating an example technique for processing originating packets arriving at an identity-aware framework (IAF) cloud service from the edge network gateway services.

FIG. 6 is a flow diagram 600 illustrating an example technique for processing/validating inbound packets 602 arriving at an IAF cloud service from the edge network gateway services or IAF enabled endpoint devices. The packet status of the flow diagram 600 may be based on application originating packets that arrive from the edge network gateway services or IAF enabled endpoint devices through the IAF tunnel at the server ports assigned to receive edge network gateway services traffic. Packets that are present at the server ports without the IAF Passport may be deemed invalid and are dropped by the IAF software.

The outer IAF cryptography session/may be decrypted 604 and the Passport of the sender may be extracted 606. The presence of valid information in the IAF Passport may be verified 608. If the information in the IAF Passport is not verified 608, the packet may be regarded as a rogue packet 610 and dropped. If the information in the IAF Passport is verified, the sender and the recipient account policies may be looked up 612 from the policy engine or the local cache 614 to confirm allowed or blocked access. If the sender and account policies are determined 616 to not be allowed, the packet is blocked and a message is sent 618 to the sender. If the sender and account polices are determined 616 to be allowed, policies may be used to setup 620 downstream packet routing. The packet may be decrypted to call 622 the decrypt packet out of the IAF tunnel, so that the packet is ready for transmission across the Internet/IAF cloud 104.

Figure 7:
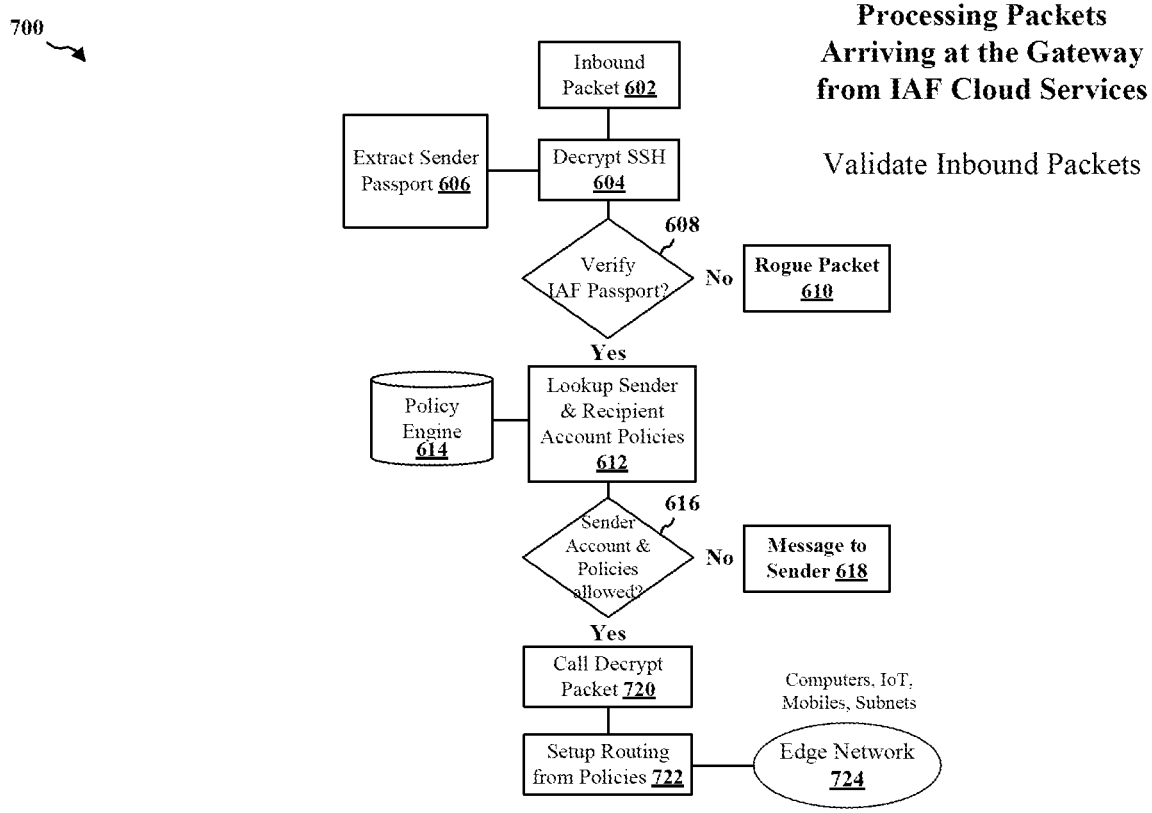
FIG. 7 is a flow diagram illustrating an example technique for processing packets arriving at the edge network gateway services from IAF cloud services.

FIG. 7 is a flow diagram 700 illustrating an example technique for processing/validating inbound packets 602 arriving at the edge network gateway services from IAF cloud services. Blocks 602-618 in FIG. 7 have already been described with respect to FIG. 6. The packet status of the flow diagram 700 may be based on packets that arrive from the IAF cloud services through the IAF tunnel at the edge network gateway services ports assigned to receive IAF policy engine traffic. Packets that are present at the edge network gateway services or IAF enabled endpoint devices ports without the Passport may be deemed invalid/rogue packets 610 and dropped by the IAF software. The IAF outer cryptography session may be decrypted 604 to reveal the Passport 614. The presence of valid IAF information in the Passport may be verified 608 or, if not, the packet may be dropped. The packet may be fully decrypted to call 720 the decrypt packet out of the IAF tunnel, so that the packet is ready, in its original form and protocol. Provenance and policies may be used to setup 722 packet routing for transmission to the local edge network 724. Packets may be routed or restricted to computers, mobile devices, IoT devices, subnets, etc. based policies and profiles.

Figure 8:
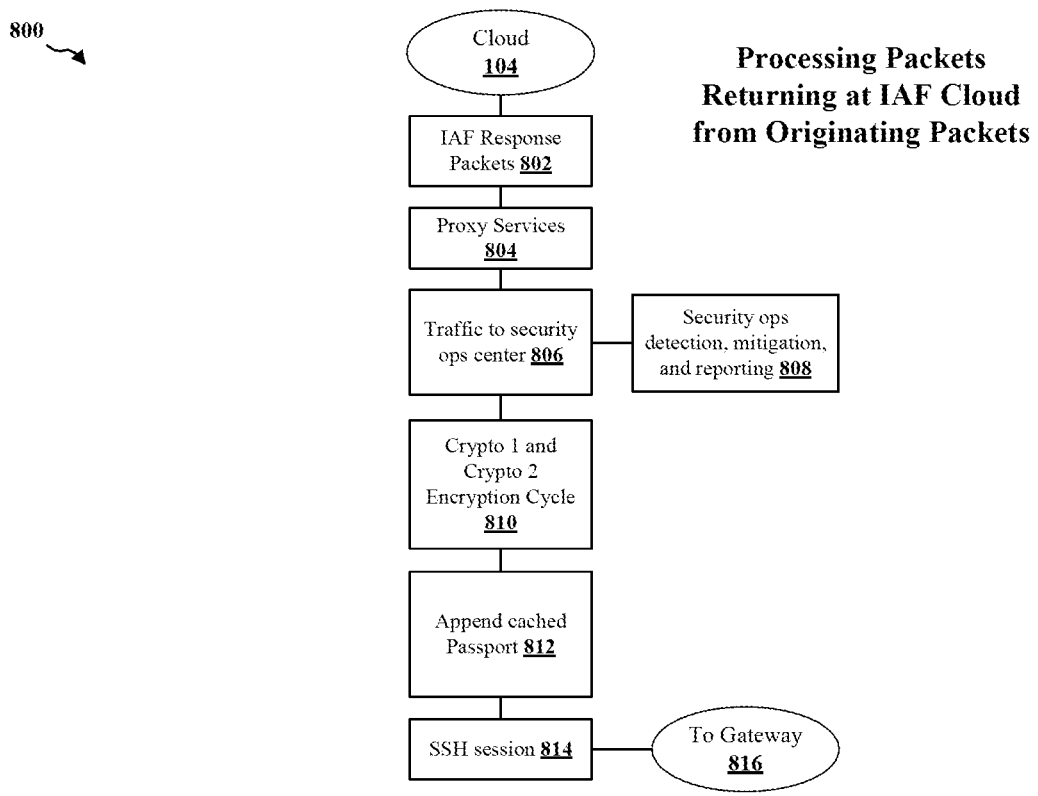
FIG. 8 is a flow diagram illustrating an example technique for processing packets returning at the IAF cloud from originating packets.

FIG. 8 is a flow diagram 800 illustrating an example technique for processing packets returning at the IAF cloud from edge network originating packets or IAF endpoint devices. IAF response packets 802 may be inbound packets returning from the cloud 104 to the IAF addresses or proxy services 804 and may be assigned to ports at the IAF cloud services for responding to email, web, and other calls originating from applications on computers and devices on the edge network. Inbound traffic returning from originating application calls may be vectored to the SOC 806, where the traffic may be vetted and passed or rejected, such as via SCO detection, mitigation, and/or reporting 808. The Cryptography 1 and Cryptography 2 encryption cycle 810 may be subsequently initiated. The cached Passport may be retrieved and appended 812. The outer cryptography session 814 may also be initiated and the packet may be communicated to the gateway 816 or IAF enabled endpoint devices via the IAF tunnel.

FIGS. 9A-9B illustrate example IAF packets 900-950, which may be associated with different IAF packet formats. The IAF packet 900 may correspond to unencrypted TCP/IP, UDP, and other packets. The Cryptography 1 encryption cycle may encrypt the entire packet, including packet headers, application payloads, and attachments that may be encrypted with an encryption key. The key may be communicated via the command channel to the Key Store at the cloud services to be forwarded to the target edge network gateway services or IAF enabled endpoint devices. The Cryptography 2 encryption cycle may be associated with the encrypted Cryptography 1 file. The IAF Passport may be subsequently appended. The Cryptography 3 cycle may be associated with the selected cryptography protocol being invoked on transmission to provide the outer and final encryption layer.

The IAF packet 950 includes similar features as the IAF packet 900, but with notable differences regarding elimination of the cryptography 1 cycle for the IAF packet 950. The cryptography 2 cycle may be associated with application layer encrypted packets, payloads and attachments, such as HTTPS, private email, etc. Packets that have already been encrypted within applications may allow for the elimination of the Cryptography 1 encryption session and may be encrypted via Cryptography 2. The IAF may identify the IP header in the clear, but other information may be encrypted and unidentifiable. To avoid initiating unnecessary encryption cycles while protecting the Passport, the fully encrypted source packet may be re-encrypted. Such procedures may eliminate the C1 symmetric encryption of encrypted packet payloads and may maintain the multi-layer cryptography model with decreased cryptography passes.

The originally encrypted packet (e.g., the previously encrypted packet) may remain intact in its entirety and may replace the symmetric Cryptography C1 pass used with standard packets. The cryptography associated with the original encrypted packet, attachments, and headers may be encrypted with C2. The IAF Passport may then be appended. The outer Cryptography, session may be initiated on transmission to provide the third and outer encryption layer. When the C3 session is decrypted, the Passport may be revealed, but the original encrypted packet payload may remain encrypted within the C2 encryption.

Video streaming, VOIP, conferencing, gaming and many other streaming services may have improved operations with low latency. The edge network gateway services may isolate streaming protocols and vector the protocols directly to the cloud with reduced interference. Such aspects may raise security issues when there is an inability to intervene in streaming packet traffic, as may be performed on the data side. While mainstream streaming services may have their own security procedures, illegal, foreign, darknet, and other similar streaming sites may be prone to malware, phishing, and other threats. Although intervention in packet streams may not occur, security protocols may be executed to monitor for and trap calls to known URLs and listed problematic sites for warning users and helping to manage access controls. Inbound packets may be received at customer networks from different directions. The standard spam, malware, and other threats that are bundled within email and web services may target email addresses and frequently visited websites. Direct attacks through IP address and port pings and other attempts to penetrate the edge network may be trapped at the edge network gateway services and rejected based on the packets not arriving through the IAF tunnel, not having the required IAF Passport.

Referring again to FIG. 1, the IAF 102 provides packets with a Passport, verifiable at endpoints, making the packets trustworthy within a secure network, and useful for distributed cloud environments. Implementing packet provenance and management within an IAF Passport that travels in association with the encrypted IAF packet, combines multiple processes into a single integrated/managed environment. The operational and security efficiencies achieved, ease-of-use, and reduced costs provide enterprise-class security to small businesses and hybrid workers as well as upstream to larger enterprises, government/defense, and internationally.

An on-demand, multi-tier IAF encryption stack encapsulates the original source application packet, without modification, via a validation and usage "Passport" to provide an IAF packet that is communicated through the IAF encrypted tunnel. The IP addressing of the original packet is not modified. Application packets are received at one end of the IAF tunnel and output at the other end of the IAF tunnel in the same form. At the destination, the IAF packet is decrypted, revealing the packet in its original source application form, and revealing the Passport that is used to validate the packet and control packet usage.

The Passport is an unencrypted data record that accompanies the packet wherever the packet travels within the IAF network. The Passport contains packet validation information, IP addresses, usage policies, encryption keys, and other controlling metrics that may be extracted and employed at hop points and endpoints to validate packets and control the usage and routing of packets locally and across the Internet worldwide, e.g., without reference to external database resources and without decrypting and exposing the packet content payload until the packet reaches the destination. The Passport that accompanies the packet allows for authentication and validation of packet traffic to prevent IP address spoofing and other threats. As a result, security costs are reduced while improving end-to-end security in a manner that simplifies network security management, delivers regulatory compliance, blocks attacks, secures previously insecure IoT devices, and advances overall Internet security.

An IAF network is established between an on-premise Gateway 116, such as an industry standard router flashed with IAF software, or from IAF software resident on endpoint computers and devices, and then across the IAF encrypted tunnel to the IAF cloud services 104 that communicates traffic to the open Internet 106. The IAF tunnel is a safety zone, within which only valid IAF traffic may travel. Packets within the IAF tunnel that do not have a Passport are deemed rogue and are quarantined or dropped and reported before such packets can get to the Gateway 116 or endpoint devices. Thus, the Passport halts attacks from the open Internet 106 because externally generated packets will not have an IAF Passport. Even a packet with a spoofed Passport will not succeed in arriving at the Gateway 116 or IAF endpoint devices because the packet cannot have the verifiable source machine fingerprint within the Passport needed to validate the packet. While IP addresses can be spoofed, the machine fingerprint cannot be spoofed. In another embodiment, the IAF software on either IAF Gateways or endpoint devices may securely interact directly with the Gateways of other IAF networks or individual computers and devices that have the IAF endpoint software, without vectoring through the IAF central cloud or third-party cloud services.

When a new IAF network is established, the Gateway 116 identifies the IP address, the MAC address, and other provenance details of the endpoint computers, servers, mobile and IoT devices on the network to generate a verifiable machine fingerprint and profile for each device. The device profile is stored centrally and cached locally. The device profile is subsequently used to validate packets at IAF network endpoints. Packet usage policies generated by system administration are also stored centrally and cached locally. The packet usage policies designate the local and remote IP addresses, networks and other resources with which packets from a specific device may or may not interact. Policies may be highly granular (e.g., down to individual devices, protocols, file types, IP geofencing, operational date and time, etc.) on remote networks or in the cloud 104. Policies are subsequently used to control the allowable routing and usage of IAF packets at IAF network endpoints.

Device source packets are created by application and utility software on endpoint computing resources and communicated, unencrypted or encrypted, to the IAF security services on either the source device or at the Gateway 116 or IAF endpoint devices. Any of the IAF encryption components may be of any type of encryption. In an example, the IAF 102 employs three layers of encryption for the data channel. The Passport may include multi-tier encryption, and may be encrypted with less security, such as with only two crypto layers.

Certain protocols (e.g., for video, VOIP, gaming, etc.) may or may not be vectored directly to the open Internet 106 without IAF tunnel intervention. The C1 crypto layer corresponds to the inner encryption layer, where the source packet, including headers, trailers and attachments, is first encrypted with an encryption key. The key is sent to the destination via the Command Channel using a single layer of encryption that may or may not include a Passport. This is in contrast to encrypted packets (e.g., HTTPS, TLS, VOIP, etc.) that may or may not omit the C1 step and proceed directly with C2. The C2 crypto layer corresponds to the middle encryption layer, where the C1 file, or previously encrypted file, is subsequently encrypted creating a C2 file. The PKI public and private keys have been previously generated and stored at endpoints using standard methods. The Passport is then generated from the cached device profile and usage policies. The Passport is bundled, unencrypted, with the C2 encrypted file and communicated to C3. The C3 crypto layer corresponds to the outer encryption layer, where the C2 bundle is further encrypted using another, but different, encryption session to become an IAF packet that is transmitted to the destination through the IAF tunnel. At the destination, or at intermediate hop points, the C3 file may be decrypted to reveal the Passport in the clear but keeping the C2 file encrypted. The packet source and destination are within the IAF local or remote network and packets moving within that network are subject to the instructions and constraints of the Passport.

Using the Device Machine Fingerprint from the Device Profile referenced in the Passport, the received packet is validated against the centrally stored and/or cached device profile. Such techniques assist with overcoming the lack of trustworthy identity based on the IP address only. An IP address may be spoofed, but the Device Fingerprint cannot be spoofed. The C2 file is decrypted, the cached C1 key is used to decrypt C1 and, based on the constraints and instructions in the Passport, the packet is communicated to the destination.

Routing and usage policies may be applied by IAF operations external to the Passport. Standard public services traffic, such as web browsing, email, etc., that moves from the Gateway 116, or IAF enabled endpoint devices, across the IAF secure tunnel to the IAF cloud services 104, may be communicated through the AWS proxy services to the open Internet 106. Between the final decryption and the hand-off to the open Internet 106 or the AWS proxy services, the Passport is extracted and cached. Traffic returning from the open Internet 106 is matched directly to the outbound traffic proxy session and the cached Passport is retrieved and appended. Traffic that is inbound from the open Internet 106, that is not the returning traffic to outbound application traffic, will not match the proxy addressing, nor will the traffic have a Passport to validate the traffic.

The IAF 102 provides direct secure linking of an edge network with hybrid workers 122 at home and on mobile devices. Previously unsecure IoT devices can come under the control of the Gateway policies, where there had been no security on most IoT devices, or an effective way to control IP traffic to and from such devices. Offering a user-intuitive interface, the administration of the IAF network can be managed by personnel without deep technical competence. Administration procedures abstract the technical details normally seen by network engineers on routers, i.e., IP addresses, port numbers, routing tables, etc., onto simple screens with check boxes and graphical maps that provides a lay user with control over the network.

With the sophistication/intelligence of the IAF tunnel, along with the embedded Passport, the IAF 102 simplifies the management of secure networks and their connected devices, costs are reduced, and security is improved. Hence, the IAF 102 provides small businesses, homes, and mobile devices a cost-effective solution for compliance with major requirements of Zero Trust, GDPR and other compliance frameworks. Because of high costs and complexities, such capabilities have previously been the domain of governments and major enterprises. However, the IAF 102 now enables the secure distributed networking of campuses, branch offices, and departmental shared projects, regardless of location worldwide, by installing the Gateways 116 and setting the policies without the need for advanced technical expertise.

Figure 10:
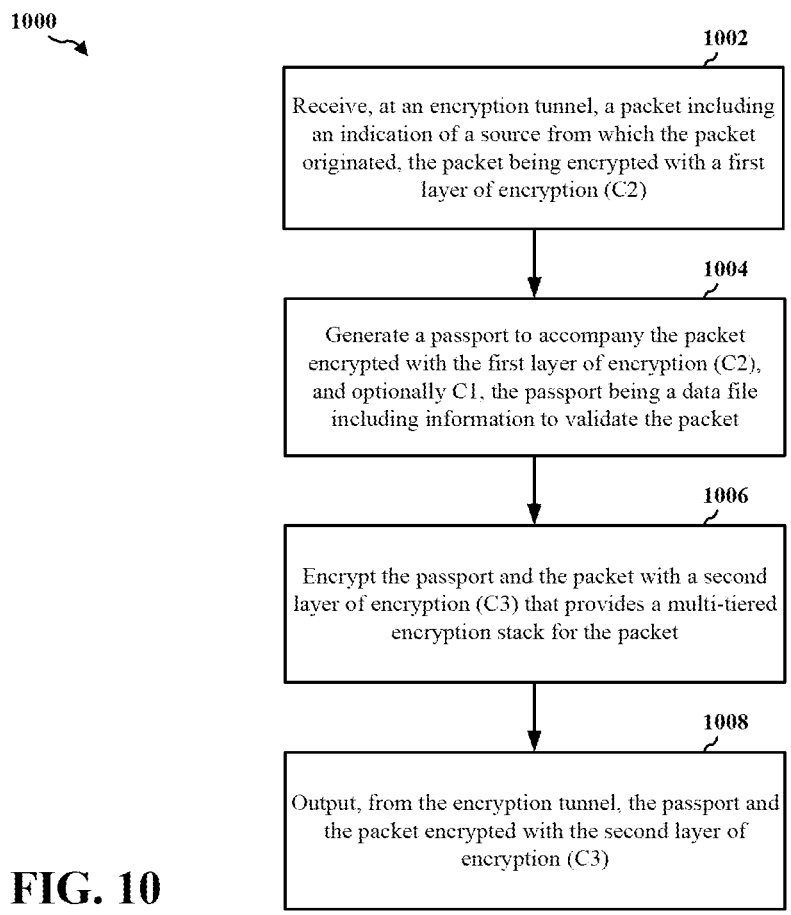
FIG. 10 is a flowchart of a method for validating a packet.

FIG. 10 is a flowchart 1000 of a method for validating a packet. The method may be performed by processing logic that may comprise hardware (e.g., circuitry, dedicated logic, programmable logic, a processor, a processing device, a CPU, a system-on-chip, etc.), software (e.g., instructions running/executing on a processing device), firmware (e.g., microcode), or a combination thereof. In some embodiments, at least a portion of the method may be performed based on aspects of FIGS. 1-9B.

With reference to FIG. 10, the method illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in the method may be performed in an order different than presented, and that not all of the blocks in the method may be performed.

The method begins at block 1002, where a processor receives, at an encryption tunnel, a packet including an indication of a source from which the packet originated, the packet being encrypted with a first layer of encryption (C2). In some examples, the packet may also be encrypted with an initial layer of encryption (C1) prior to the first layer of encryption (C2).

At block 1004, the processor generates a Passport to accompany the packet encrypted with the first layer of encryption (C2), and optionally C1, the Passport being a data file including information to validate the packet.

At block 1006, the processor encrypts and the packet with a second layer of encryption (C3) that provides a multi-tiered encryption stack for the packet.

At block 1008, the processor outputs, from the encryption tunnel, the passport and the packet encrypted within the second layer of encryption (C3).

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Example 1 is a method including receiving, at an encryption tunnel, a packet including an indication of a source from which the packet originated, the packet being encrypted with a first layer of encryption; generating a passport to accompany the packet encrypted with the first layer of encryption, the passport being a data file including information to validate the packet; encrypting the passport and the packet with a second layer of encryption that provides a multi-tiered encryption stack for the packet; and outputting, from the encryption tunnel, the passport and the packet encrypted with the second layer of encryption.

Example 2 may be combined with Example 1 and further includes decrypting the second layer of encryption of the multi-tiered encryption stack to reveal the packet encrypted with the first layer of encryption and the passport, the passport being appended to the packet encrypted with the first layer of encryption.

Example 3 may be combined with any of Examples 1-2 and further includes validating, based on the information included in the passport, the packet encrypted with the first layer of encryption.

Example 4 may be combined with any of Examples 1-3 and includes that the packet is validated at a hop point or an endpoint without reference to an external database.

Example 5 may be combined with any of Examples 1-4 and further includes decrypting, at a destination of the packet, the first layer of encryption based on the packet being validated using the information included in the passport.

Example 6 may be combined with any of Examples 1-5 and includes that the data file including the information to validate the packet is separate from a header of the packet and a trailer of the packet, the header of the packet and the trailer of the packet corresponding to a protocol structure and a use indicated by Internet Engineering Task Force (IETF) request for comments (RFC).

Example 7 may be combined with any of Examples 1-6 and includes that a format of the passport includes JavaScript Object Notation (JSON) or extensible markup language (XML).

Example 8 may be combined with any of Examples 1-7 and further includes rejecting the packet when the packet is not accompanied by the passport within the encryption tunnel.

Example 9 may be combined with any of Examples 1-8 and includes that the passport includes at least one of: provenance information, an IP address, a device profile, a usage policy, an encryption key, or a device fingerprint.

Example 10 may be combined with any of Examples 1-9 and includes that the device fingerprint is for an IoT device.

Example 11 may be combined with any of Examples 1-10 and includes that the packet includes an initial layer of encryption prior to the first layer of encryption, and includes that the initial layer of encryption corresponds to a C1 inner encryption layer, the first layer of encryption corresponds to a C2 middle encryption layer, and the second layer of encryption corresponds to a C3 outer encryption layer.

Example 12 may be combined with any of Examples 1-11 and includes that the packet is at least one of: encrypted within the encryption tunnel or encrypted prior to the receiving the packet at the encryption tunnel.

Example 13 may be combined with any of Examples 1-12 and includes that the indication of the source from which the packet originated corresponds to an internet protocol (IP) address.

Example 14 is an apparatus for implementing a method as in any of Examples 1-13.

Example 15 is an apparatus including means for implementing a method as in any of Examples 1-13.

Example 16 is a non-transitory computer-readable medium storing computer executable code, the code when executed by at least one processor causes the at least one processor to implement a method as in any of Examples 1-13.

What is claimed is:

1. A method comprising:
   receiving, at an encryption tunnel, a packet including an indication of a source from which the packet originated, the packet being encrypted with a first layer of encryption;
   generating a passport to accompany the packet encrypted with the first layer of encryption, the passport being a data file including embedded provenance information to validate the source from which the packet originated and an embedded usage policy to control a usage of the packet the data file not being a header of the packet or trailer of the packet;

encrypting the passport and the packet with a second layer of encryption that provides a multi-tiered encryption stack for the packet; and outputting, from the encryption tunnel, the passport and the packet encrypted with the second layer of encryption.

2. The method of claim 1, further comprising:

decrypting the second layer of encryption of the multi-tiered encryption stack to reveal the packet encrypted with the first layer of encryption and the passport, the passport being appended to the packet encrypted with the first layer of encryption.

3. The method of claim 2, further comprising:

validating, based on the information included in the passport, the packet encrypted with the first layer of encryption.

4. The method of claim 3, wherein the packet is validated at a hop point or an endpoint without reference to an external database.

5. The method of claim 3, further comprising:

decrypting, at a destination of the packet, the first layer of encryption based on the packet being validated using the information included in the passport.

6. The method of claim 1, wherein the header of the packet and the trailer of the packet corresponding to a protocol structure and a use indicated by Internet Engineering Task Force (IETF) request for comments (RFC).

7. The method of claim 1, wherein a format of the passport includes JavaScript Object Notation (JSON) or extensible markup language (XML).

8. The method of claim 1, further comprising:

rejecting the packet when the packet is not accompanied by the passport within the encryption tunnel.

9. The method of claim 1, wherein the passport includes at least one of: an internet protocol (IP) address, a device profile, an encryption key, or a device fingerprint.

10. The method of claim 1, wherein the passport includes a device fingerprint for an internet-of-things (IoT) device.

11. The method of claim 1, wherein the packet includes an initial layer of encryption prior to the first layer of encryption, and wherein the initial layer of encryption corresponds to a cryptography 1 (C1) inner encryption layer, the first layer of encryption corresponds to a cryptography 2 (C2) middle encryption layer, and the second layer of encryption corresponds to a cryptography 3 (C3) outer encryption layer.

12. The method of claim 1, wherein the packet is at least one of: encrypted within the encryption tunnel or encrypted prior to the receiving the packet at the encryption tunnel.

13. The method of claim 1, wherein the indication of the source from which the packet originated corresponds to an internet protocol (IP) address.

14. The method of claim 1, wherein the packet usage policy controls the usage of the packet at a granularity of at least one of: an individual computing device, an internet of things (IoT) device, a machine sensor, a protocol, a file type, and internet protocol (IP) geofencing level, an operational date, or an operation time.

15. An apparatus comprising:

a memory; and at least one processor coupled to the memory and configured to:

receive, at an encryption tunnel, a packet including an indication of a source from which the packet originated, the packet being encrypted with a first layer of encryption;

generate a passport to accompany the packet encrypted with the first layer of encryption, the passport being a data file including embedded provenance information to validate the source from which the packet originated and an embedded usage policy to control a usage of the packet, the data file not being a header of the packet or a trailer of the packet;

encrypt the passport and the packet with a second layer of encryption that provides a multi-tiered encryption stack for the packet; and output, from the encryption tunnel, the passport and the packet encrypted with the second layer of encryption.

16. The apparatus of claim 15, wherein the at least one processor is further configured to:

decrypt the second layer of encryption of the multi-tiered encryption stack to reveal the packet encrypted with the first layer of encryption and the passport, the passport being appended to the packet encrypted with the first layer of encryption.

17. The apparatus of claim 16, wherein the at least one processor is further configured to:

validate, based on the information included in the passport, the packet encrypted with the first layer of encryption.

18. The apparatus of claim 17, wherein the packet is validated at a hop point or an endpoint without reference to an external database.

19. The apparatus of claim 17, wherein the at least one processor is further configured to:

decrypt, at a destination of the packet, the first layer of encryption based on the packet being validated using the information included in the passport.

20. The apparatus of claim 15, wherein the data file including the information to validate the packet is not a header of the packet or a trailer of the packet, the header of the packet and the trailer of the packet corresponding to a protocol structure and a use indicated by Internet Engineering Task Force (IETF) request for comments (RFC).

21. A non-transitory computer-readable medium storing computer executable code, the code when executed by at least one processor causes the at least one processor to:

receive, at an encryption tunnel, a packet including an indication of a source from which the packet originated, the packet being encrypted with a first layer of encryption;

generate a passport to accompany the packet encrypted with the first layer of encryption, the passport being a data file including embedded provenance information to validate the source from which the packet originated and a embedded usage policy to control a usage of the packet, the data file not being a header of the packet or a trailer of the packet;

encrypt the passport and the packet with a third layer of encryption that provides a multi-tiered encryption stack for the packet; and output, from the encryption tunnel, the passport and the packet encrypted with the third layer of encryption.

* * * * *